United States Patent
Takahashi

(10) Patent No.: US 8,150,819 B2
(45) Date of Patent: Apr. 3, 2012

(54) INFORMATION-PROCESSING APPARATUS SEARCHING WEB SERVER AND DOWNLOADING DATA, DATA SEARCHING METHOD AND DATA SEARCHING PROGRAM EXECUTED IN INFORMATION-PROCESSING APPARATUS

(75) Inventor: Kazusei Takahashi, Nishinomiya (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 422 days.

(21) Appl. No.: 11/855,582

(22) Filed: Sep. 14, 2007

(65) Prior Publication Data
US 2008/0147643 A1    Jun. 19, 2008

(30) Foreign Application Priority Data
Dec. 14, 2006    (JP) ................................. 2006-337365

(51) Int. Cl.
*G06F 7/00* (2006.01)
(52) U.S. Cl. ........ 707/705; 707/783; 709/217; 709/219; 709/225; 709/229; 715/743
(58) Field of Classification Search ............... 707/3, 705
See application file for complete search history.

(56) References Cited

U.S. PATENT DOCUMENTS

| | | | |
|---|---|---|---|
| 6,006,332 A * | 12/1999 | Rabne et al. ...................... 726/6 |
| 6,047,313 A | 4/2000 | Hashimoto et al. |
| 2002/0062341 A1 | 5/2002 | Sueki et al. |
| 2003/0011800 A1 | 1/2003 | Miyahara et al. |
| 2004/0255034 A1 * | 12/2004 | Choi .............................. 709/229 |
| 2005/0005242 A1 * | 1/2005 | Hoyle ............................ 715/745 |
| 2005/0080764 A1 * | 4/2005 | Ito ..................................... 707/1 |
| 2005/0139673 A1 | 6/2005 | Yokoyama |
| 2005/0231754 A1 * | 10/2005 | Uchida ......................... 358/1.15 |

FOREIGN PATENT DOCUMENTS

| | | |
|---|---|---|
| JP | 10-105453 | 4/1998 |
| JP | 11-341212 | 12/1999 |
| JP | 2002-157096 (A) | 5/2002 |
| JP | 2002-157270 (A) | 5/2002 |
| JP | 2002-35916 (A) | 12/2002 |
| JP | 2003-228466 | 8/2003 |
| JP | 2005-191686 | 7/2005 |

OTHER PUBLICATIONS

Notice of Ground of Rejection in JP 2006-337365 dated Mar. 24, 2009, and an English Translation thereof.
Decision of Rejection in JP 2006-337365 dated Jun. 23, 2009, and an English Translation thereof.

* cited by examiner

*Primary Examiner* — Fazlul Quader
(74) *Attorney, Agent, or Firm* — Buchanan Ingersoll & Rooney P.C.

(57) ABSTRACT

In order to efficiently search web pages, an MFP has browsing processing portion to receive a web page from a Web server, an execution instruction accepting portion to accept an execution instruction specifying processing to be executed with respect to the received web page, and a user relating portion to store a URL for access to the web page when the accepted execution instruction specifies processing other than the processing for display. Thus, an efficient search of web pages can be executed.

23 Claims, 12 Drawing Sheets

FIG. 4

181  USER RELATION INFORMATION

| ACCESS INFORMATION | KEY WORD | USER IDENTIFICATION INFORMATION |
|---|---|---|

FIG. 5

183  USER DEFINITION INFORMATION

| USER IDENTIFICATION INFORMATION | ATTRIBUTE INFORMATION | |
| | ATTRIBUTE | USER KEY WORD |

F I G. 7

```
SET A TABLE OF REGISTERED URL/SEARCH KEY WORD
    ◎ WHAT TO DISPLAY
        ☑ REGISTERED URL    ☐ REGISTERED KEY WORD

◎ USER SEARCH RANGE
        ☐ INPUT USER IDENTIFICATION INFORMATION
           [                                      ]

☑ INPUT USER ATTRIBUTE INFORMATION
           [SOFTWARE, HARDWARE, APPLICATION, RESEARCH]

◎ MFP SEARCH RANGE                APPARATUS POSSESSED BY THIS
        ☐ THIS APPARATUS    ☐         DEPARTMENT
        ☑ APPARATUS POSSESSED BY ASSOCIATED DEPARTMENT
           INPUT DEPARTMENT NAME  [○○LABORATORY]
    ◎ NARROWING DOWN
        ☑ NARROW DOWN
           INPUT NARROWING DOWN CONDITIONS
           [△△STANDARD]

[        START REFERENCE        ]
```

FIG. 8

```
REGISTER USER RELATION RECORD

◎ NEWLY REGISTERED DATA (URL & keyword)
     URL:www.atmarkitinfo.co.jp/nyumon/rcscript
     KEY WORD: rc, SCRIPT ◎ REGISTERED MFP
      DEPARTMENT NAME: FIRST DESIGN DEPARTMENT
      MFP NO. : No.1

◎ INPUT USER IDENTIFICATION INFORMATION,
    ATTRIBUTE INFORMATION
     ☑ INPUT USER IDENTIFICATION INFORMATION
         □○☆△

☐ ATTRIBUTE INFORMATION (INPUT AMENDED)
         WORK STATION, ADMINISTRATION
```

| ATTRIBUTE REGISTRATION | NO ATTRIBUTE REGISTRATION |

FIG. 10

| USER IDENTIFICATION INFORMATION | NARROWING WORD |
|---|---|
| □△○★ | ○×STANDARD、△△STANDARD、▼☆TECHNIQUE |

| |
|---|
| www.○×.org |
| www.△△.org |
| www.information.com/▼☆-tech |

| EMPLOYEE NO. | KEY WORD |
|---|---|
| ○○△△ | USB, COMPATIBILITY |
| ○△□△ | BROWSER, SECURITY |
| ○×○△ | DATA BASE, EFFICIENCY |
| ☆□△× | BOOT, SCRIPT |
| △☆×○ | PRINTER, DRIVER |

F I G. 1 4

```
○○SEARCH ENGINE [ rc ]              [SEARCH]
       ○All WEB PAGES   ●ONLY PAGES IN JAPANESE
```

SEARCH RESULTS

29. □○ROTARY CLUB
    CLUB REPORT, SCHEDULE, AND THE LIKE
    www.□○-rc.org
30. EVERYTHING YOU NEED TO KNOW ABOUT REINFORCED CONCRETE HOUSING!
    WE HELP TO DESIGN AND CREATE ACCOMMODATIONS TO SUIT YOUR TASTES AND STYLE
    www.housing△△.co.jp
31. PLANNING TO BUILD A REINFORCED CONCRETE HOUSE? HERE'S THE PLACE TO GO
    FIND VARIOUS CATALOGS AT ××HOMES
    www.××-homes.co.jp
32. @IT TIPS: HOW TO BOOT Linux
    GET HOW TO BOOT Linux (rc SCRIPT)
    www.atmarkitinfo.co.jp/nyumon/rcscript 1 2 3 4 5 6 7 8 9 10 NEXT

INFORMATION-PROCESSING APPARATUS SEARCHING WEB SERVER AND DOWNLOADING DATA, DATA SEARCHING METHOD AND DATA SEARCHING PROGRAM EXECUTED IN INFORMATION-PROCESSING APPARATUS

This application is based on Japanese Patent Application No. 2006-337365 filed with Japan Patent Office on Dec. 14, 2006, the entire content of which is hereby incorporated by reference.

BACKGROUND OF THE INVENTION

1. Field of the Invention

The present invention relates to an information-processing apparatus, a data searching method, and a data searching program, and more particularly to an information-processing apparatus that searches a web server to download data, and a data searching method and a data searching program that are executed in the information-processing apparatus.

2. Description of the Related Art

In recent years, compound machines referred to as MFPs (Multi Function Peripherals) equipped with the functions of the scanner, printer, copying machine, and facsimile are often used in a network. It is desired to provide the MFPs with the browsing function to connect themselves to the Internet and have access to search engines such as web servers in order to download data. This is convenient in that data downloaded by the MFPs can be recorded, printed, or transmitted to some other apparatus.

However, this is problematic in that a user who is browsing finds it difficult to search a search engine and desired data, or select an appropriate keyword for searching. In particular, there is a need for even more easy searching of search engines using MFPs, since MFPs have fewer operation keys than personal computers and are used by a plurality of users.

A technique to efficiently search a search engine is disclosed in, for example, Japanese Laid-Open Publication Nos. 2002-351916, 2002-157096, and 2002-157270.

SUMMARY OF THE INVENTION

The present invention has been accomplished in view of the foregoing problems, and it is an object of the present invention to provide an information-processing apparatus capable of executing an efficient search for data.

It is another object of the present invention to provide a data searching method and a data searching program that are capable of executing an efficient search for data.

In order to accomplish the above objects, according to an aspect of the present invention, there is provided an information-processing apparatus comprising: a data receiving portion to receive data from outside the apparatus; an instruction accepting portion to accept an execution instruction specifying processing to be executed with respect to the received data; and an access storing portion to store access information for access to the data when the accepted execution instruction specifies processing other than the processing for display.

According to another aspect of the present invention, the information-processing apparatus further comprises: a key word accepting portion to accept key words for searching for data; a result acquiring portion to transmit the accepted key words to a search server and to receive a search result from the search server; a result display portion to display the received search result; a designation accepting portion to accept designation of access information included in the displayed search result; a data receiving portion to receive data specified by externally designated access information; an instruction accepting portion to accept an execution instruction specifying processing to be executed with respect to the received data; and a key word storing portion to store the acquired key words when the accepted execution instruction specifies processing other than the processing for display.

According to another aspect of the present invention, there is provided a method for comprising: externally receiving data; accepting an execution instruction specifying processing to be executed with respect to the received data; and storing access information for access to the data when the accepted execution instruction specifies processing other than the processing for display.

According to another aspect of the present invention, there is provided a method for comprising: acquiring key words for searching for data; transmitting the acquired key words to a search server and receiving a search result from the search server, the search result including access information for access to data; displaying the received search result; accepting designation of the access information included in the displayed search result; externally receiving data specified by the designated access information; accepting an execution instruction specifying processing to be executed with respect to the received data; and storing the acquired key words when the accepted execution instruction specifies processing other than the processing for display.

According to another aspect of the present invention, there is provided a data searching program embodied in a computer readable medium and executed by a computer, the program causing the computer to execute processing comprising: externally receiving data; accepting an execution instruction specifying processing to be executed with respect to the received data; and storing access information for access to the data when the accepted execution instruction specifies processing other than the processing for display.

According to another aspect of the present invention, there is provided a data searching program embodied in a computer readable medium and executed by a computer, the program causing the computer to execute processing comprising: acquiring key words for searching for data; transmitting the acquired key words to a search server and receiving a search result from the search server, the search result including access information for access to data; displaying the received search result; accepting designation of the access information included in the displayed search result; externally receiving data specified by the designated access information; accepting an execution instruction specifying processing to be executed with respect to the received data; and storing the acquired key words when the accepted execution instruction specifies processing other than the processing for display.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an example of the format of user relation information.

FIG. 5 is a diagram showing an example of the format of user definition information.

FIG. 7 is a diagram showing an example of the search condition setting screen.

FIG. 8 is a diagram showing an example of the user relation record registration screen.

FIG. 10 is a diagram showing an example of the URL search result display screen.

FIG. 14 is a diagram showing an example of the search result display screen.

DESCRIPTION OF THE PREFERRED EMBODIMENTS

Figure 1:
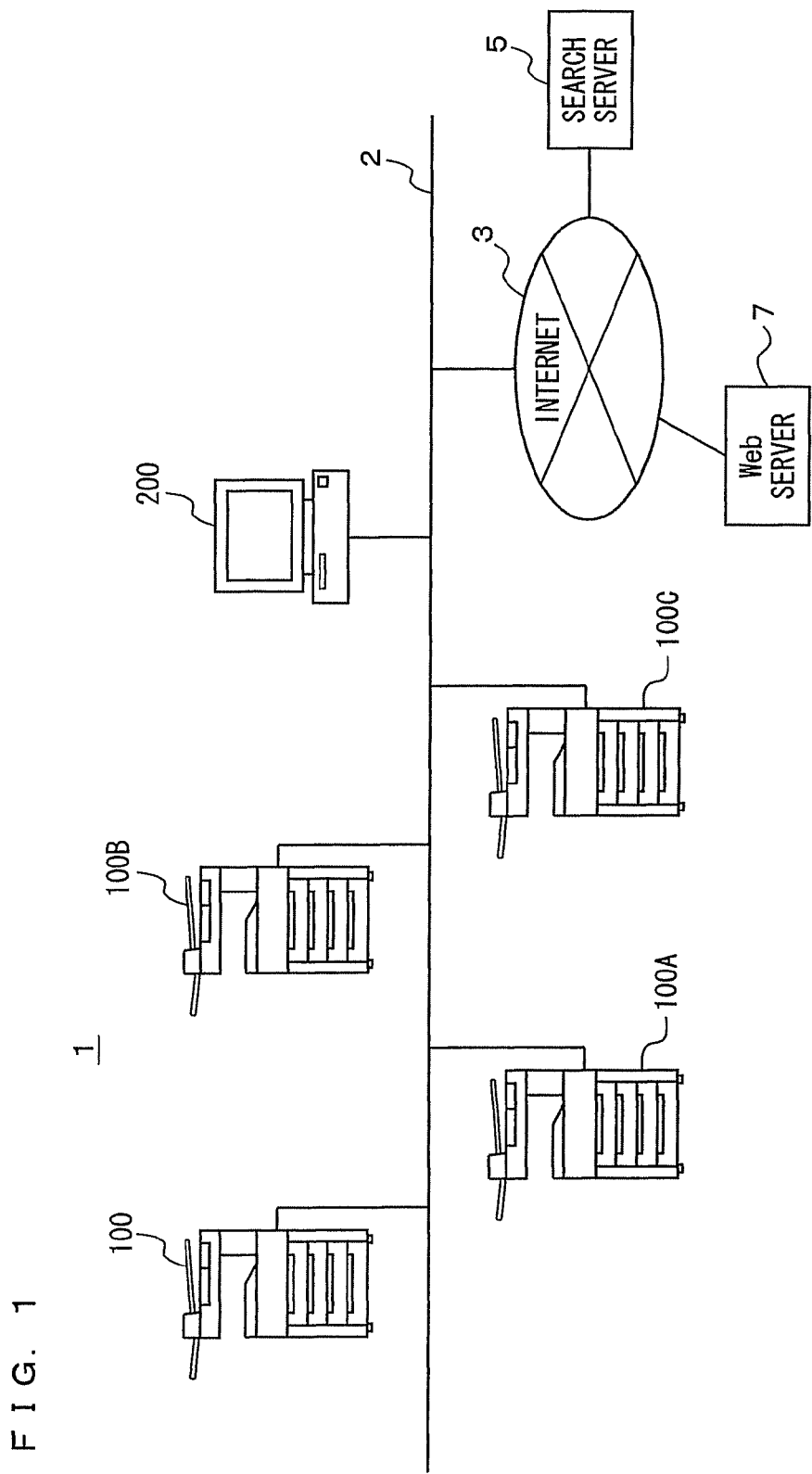
FIG. 1 is a schematic diagram of an information-processing system according to an embodiment of the present invention.

Embodiments of the present invention will be described below referring to the drawings. In the following description, parts having like functions and names will be denoted with like numerals, and therefore description thereof will not be repeated.

FIG. 1 is a schematic diagram of an information-processing system according to an embodiment of the present invention. Referring to FIG. 1, an information-processing system 1 includes, as information-processing apparatuses, compound machines (hereinafter referred to as MFPs) 100, 100A, 100B, and 100C, and a personal computer (hereinafter referred to as a PC) 200 each connected to a network 2. The MFPs 100, 100A, 100B, and 100C are image-processing apparatuses equipped with a plurality of functions including the scanner function, printer function, copying function, facsimile function, and the like. The PC 200 is a usual computer.

The network 2 is a local area network (LAN), and the connection can be either by wire or radio. Also, the network 2 is not limited to a LAN and can be a wide area network (WAN), the public switched telephone network (PSTN), or the like. The network 2 is connected to the Internet 3, and the MFPs 100, 100A, 100B, and 100C are communicable with a search server 5 and a web server 7 that are connected to the Internet 3. The MFPs 100, 100A, 100B, and 100C each have the browsing function. For example, the MFP 100 transmits a key word to the search server 5 and receives a search result transmitted from the search server 5. The search result includes, for example, the URL, (Uniform Resource Locator) of a web page possessed by the web server 7. When this URL is designated, the MFP 100, which has received the search result, demands the web server 7 to transmit the web page specified by the URL, and receives the web page transmitted from the web server 7.

While in this embodiment the MFPs (Multi Functional Peripherals) 100, 100A, 100B, and 100C are taken as an example of the information-processing apparatus, any other apparatus can substitute the MFPs insofar as the browsing function is equipped such as the PC 200, a scanner, a printer, and a facsimile.

The MFPs 100, 100A, 100B, and 100C have the same structures and structures, and therefore the MFP 100 will be taken as an example here.

Figure 2:
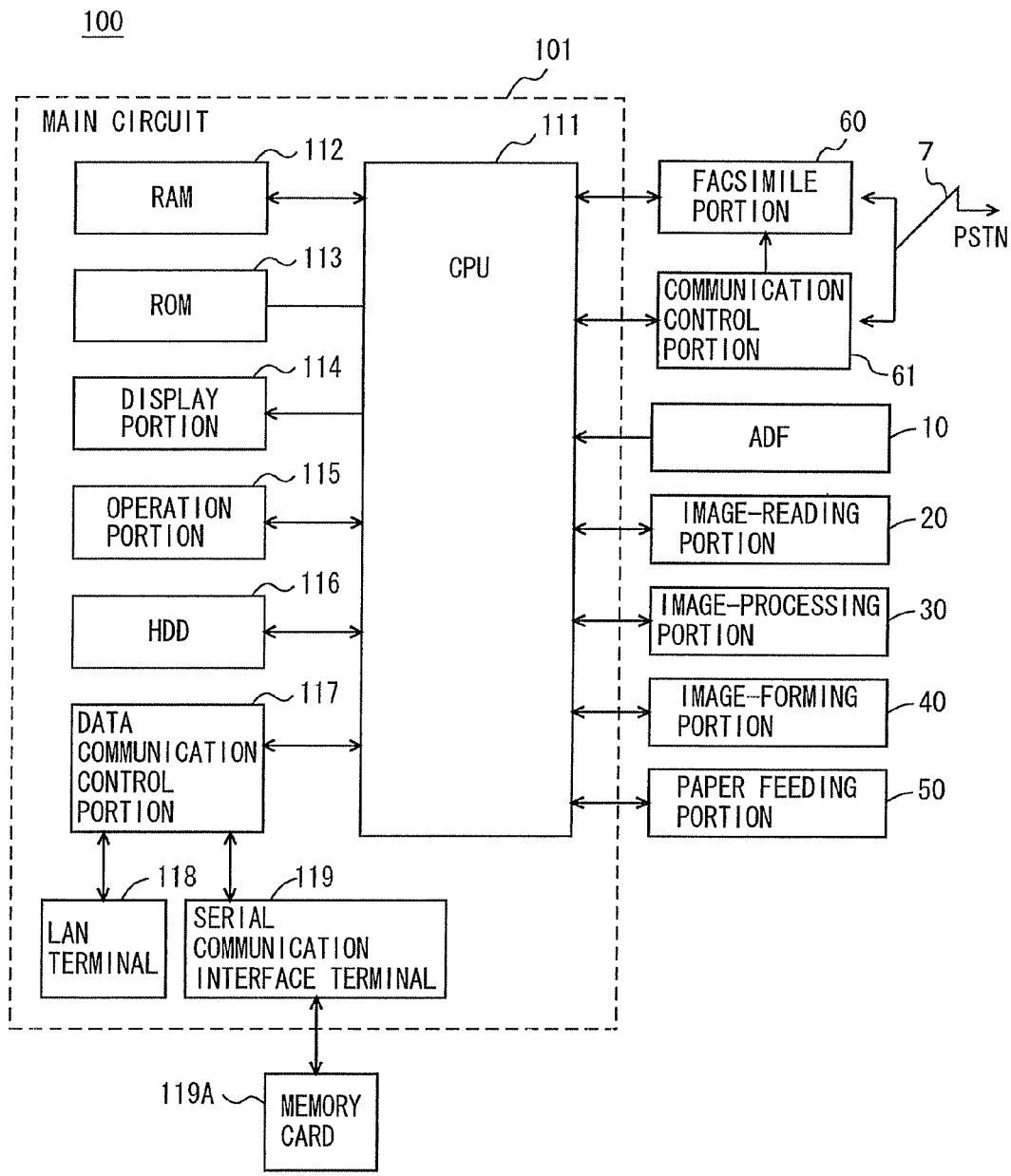
FIG. 2 is a block diagram showing an example of the hardware structure of an MFP.

FIG. 2 is a block diagram showing an example of the hardware structure of the MFP. Referring to FIG. 2, the MFP 100 includes a main circuit 101, a facsimile portion 60, a communication control portion 61, an automatic document feeder (ADF) 10, an image-reading portion 20 to read text images and output image data, an image-processing portion 30 to carry out image processing of image data, an image-forming portion 40 to form an image on the basis of image data, and a paper feeding portion 50 to feed the image-forming portion 40 with recording sheets of, for example, paper.

The main circuit 101 includes a central processing unit (CPU) 111, a RAM (Random Access Memory) 112 used as a working area for the CPU 111, a ROM (Read Only Memory) 113 that stores a program or the like to be executed at the CPU 111, a display portion 114, an operation portion 115, a hard disk drive (HDD) 116 as a mass storage, and a data communication control portion 117. The CPU 111 is connected to the display portion 114, operation portion 115, HDD 116, and data communication control portion 117, and controls the entire main circuit 101. The CPU 111 is connected to the facsimile portion 60, communication control portion 61, ADF 10, image-reading portion 20, image-processing portion 30, image-forming portion 40, and paper feeding portion 50, and controls the entire MFP 100.

The display portion 114 is a display device such as a liquid crystal display (LCD), an organic ELD (Electro-Luminescence Display), or the like, and displays an instruction menu for users, information about acquired information, and the like. The operation portion 115 has a plurality of keys and accepts users' input, which corresponds to the keys, of various instructions and data including characters and numbers. The operation portion 115 includes a touch panel provided on the display portion 114. The display portion 114 and the operation portion 115 constitute the operation panel provided on the top surface of the MFP 100.

The data communication control portion 117 includes a LAN terminal 118 that is an interface for communication according to a communication protocol such as TCP (Transmission Control Protocol) and FTP (File Transfer Protocol), and a serial communication interface terminal 119 for serial communication. According to instructions from the CPU 111, the data communication control portion 117 transmits and receives data to and from an external apparatus connected to the LAN terminal 118 or the serial communication interface terminal 119.

When a LAN cable for connection to the network 2 is connected to the LAN terminal 118, the data communication control portion 117 communicates with the MFPs 100A, 100B, 100C, scanner, printer, or PC 200, which are connected to the data communication control portion 117 via the LAN terminal 118. The data communication control portion 117 communicates with the search server 5 and the web server 7, which are connected to the Internet 3.

According to a user's storage instruction input in the operation portion 115, the CPU 111 stores in the HDD 116 a web page (image data) received by the data communication control portion 117 from the web server 7 (data storage). Alternatively, the CPU 111 transmits the web page to, for example, the PC 200 via the data communication control portion 117 according to a user's transmission instruction input in the operation portion 115 (data transmission). The data transmission includes the case of transmitting image data to another facsimile device via the facsimile portion 60. Further, according to a user's print instruction input in the operation portion 115, the CPU 111 causes the image-forming portion 40 to form an image of the web page (image data) received by the data communication control portion 117 from the web server 7 (print).

When an apparatus is connected to the serial communication interface terminal 119, the data communication control portion 117 inputs or outputs image data by communicating with the apparatus connected to the serial communication interface terminal 119 such as a digital camera, a digital video camera, and a mobile information terminal. To the serial communication interface terminal 119, a memory card 119A having a flash memory therein is also connectable. The CPU 111 controls the data communication control portion 117 to read, from the memory card 119A, a data search program to be executed by the CPU 111, and stores the read data search program in the RAM 112 and executes it.

Recording media that stores the data search program executed by the CPU 111 is not limited to the memory card 119A and can also be the media that records a program in a fixed manner, such as a flexible disk, a cassette tape, an optical disk [CD-ROM (Compact Disc-Read Only Memory)/MO (Magnetic Optical Disc)/MD (Mini Disc)/DVD (Digital Versatile Disc)], an IC card (including a memory card), an optical card, and a semiconductor memory such as a masked ROM, an EPROM (Erasable Programmable ROM), an EEPROM (Electronically EPROM), and the like. It is also possible that the CPU 111 downloads a data search program from a computer connected to the Internet and stores it in the HDD 116, or that a computer connected to the Internet writes a data search program into the HDD 116 so that the data search program stored in the HDD 116 is loaded into the RAM 112 and executed in the CPU 111. The program, as used herein, not only includes a program directly executable by the CPU 101, but also a source program, a compressed program, an encrypted program, and the like.

The communication control portion 61 is a modem for connecting the CPU 111 to the PSTN 7. The MFP 100 is assigned a telephone number in the PSTN 7 in advance. When a facsimile connected to the PSTN 7 makes a call to the telephone number assigned to the MFP 100, the communication control portion 61 detects the call. Upon detecting the call, the communication control portion 61 establishes a communication for the facsimile 60.

The facsimile portion 60 is connected to the PSTN 7, and transmits facsimile data to the PSTN 7 or receives facsimile data from the PSTN 7.

Figure 3:
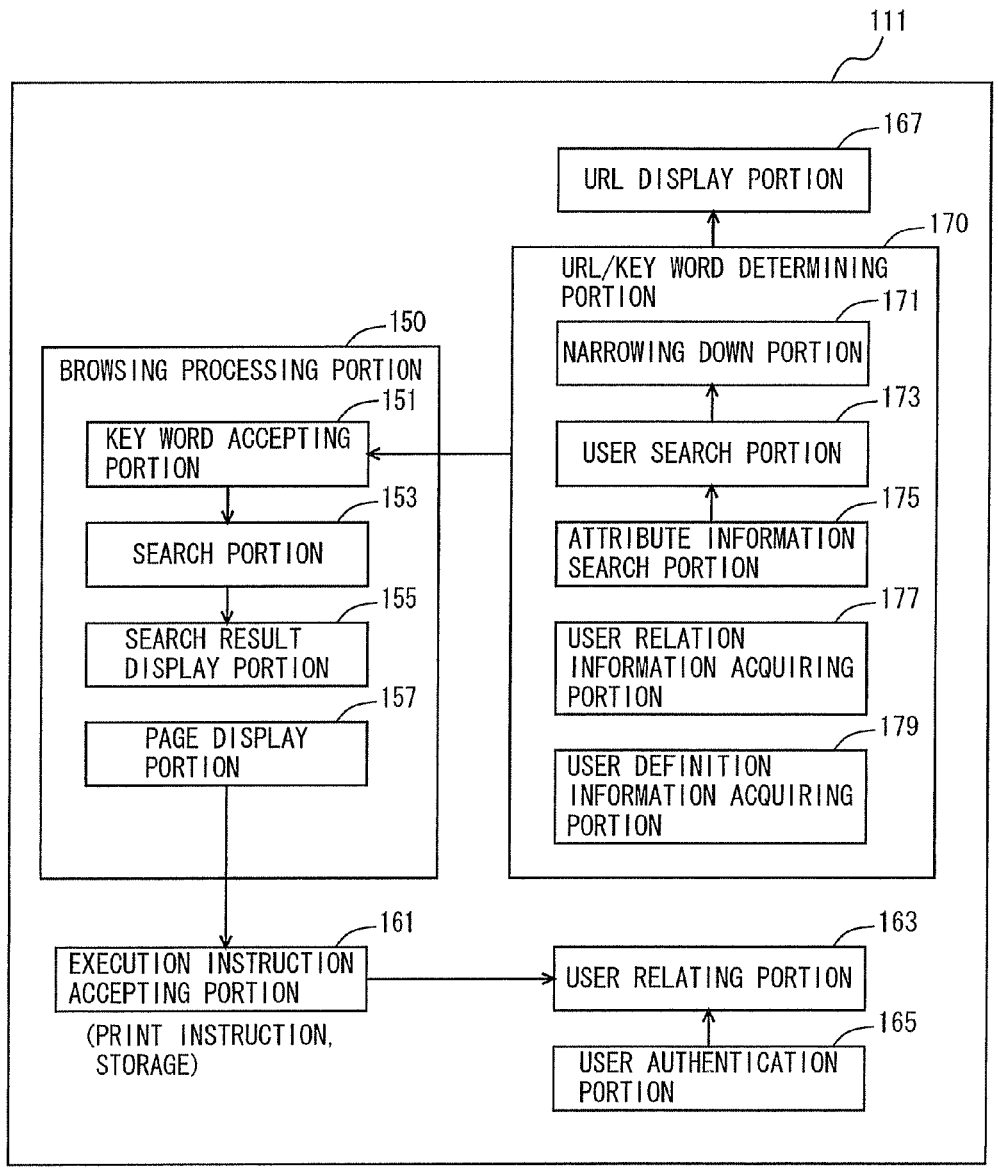
FIG. 3 is a block diagram showing an example of the function of the CPU.

FIG. 3 is a block diagram showing an example of the function of the CPU. Referring to FIG. 3, the CPU 111 includes a browsing processing portion 150 to search for and display a web page, an execution instruction accepting portion 161 to accept an instruction of processing executed with respect to the displayed web page, a user authentication portion 165 to authenticate a user, a user relating portion 163 to relate the URL of a web page for which processing to be executed has been instructed to the authenticated user, a URL/key word determining portion 170 to determine the URL or key words for searching for the URL, and a URL display portion 167 to display the determined URL.

The browsing processing portion 150 is a function realized by the CPU 111 by executing a browser program stored in the ROM 113. The browsing processing portion 150 includes a key word accepting portion 151 to accept key words, a search portion 153 to transmit the key words to the search server 5 and to receive a search result, a search result display portion 155 to display on the display portion 114 the search result received by the search portion 153, and a page display portion 157 to, upon receiving a URL, display on the display portion 114 a web page specified by the URL.

The key word accepting portion 151 accepts from the operation portion 115 key words input by a user through the operation portion 115. The key word accepting portion 151 also accepts key words input from the URL/key word determining portion 170. When a plurality of key words are input through the operating portion 115, the key word accepting portion 151 accepts the plurality of key words, and when a plurality of key words are input from the URL/key word determining portion 170, the key word accepting portion 151 accepts the plurality of key words. The key word accepting portion 151 outputs the accepted key words to the search portion 153.

The search portion 153 transmits the input key words to the search server 5. The search server 5 is provided with a search engine, and upon receiving the key words, search the data base using the key words and transmits a search result to the MFP 100, which has transmitted the key words. The search result is described in, for example, a markup language such as HTML. The search portion 153 receives the search result transmitted from the search server 5 and outputs the search result to the search result display portion 155. The search result display portion 155 displays the input search result on the display portion 114. The search result includes the URL of the web page related to the key words. The URL is access information for access to the web page and location information indicating the location of the web page on the network. The search portion 153 relates the input key words with the URL included in the search result and temporarily stores them in the RAM 112.

The page display portion 157 accepts the URL. The page display portion 157 accepts from the operation portion 115 the URL input by a user through the operation portion 115. When the user designates the URL included in the search result displayed on the display portion 114 by the search result display portion 155, the page display portion 157 accepts the designated URL from the search result display portion 155. Further, when the user designates a URL included a URL list displayed on the display portion 114 by a URL display portion 167, described later, the page display portion 157 accepts the designated URL from the URL display portion 167.

The page display portion 157 demands the apparatus specified by the accepted URL to transmit the web page specified by the URL. For example, assume that the apparatus specified by the URL is the web server 7. The page display portion 157 transmits to the web server 7 a demand signal for demanding transmission of the web page specified by the URL. The web server 7 stores web pages, and upon receiving a demand signal, reads the web page specified by the URL included in the demand signal and transmits the web page to the MFP 100, which has transmitted the demand signal. The web page is described in, for example, a markup language such as HTML. The page display portion 157 receives the web page transmitted from the web server 7 and displays the web page on the display portion 114.

With the web page displayed on the display portion 114, the execution instruction accepting portion 161 accepts an execution instruction for executing processing with respect to the web page. The execution instruction accepting portion 161 accepts from the operation portion 115 an execution instruction input by the user through the operation portion 115. The execution instruction includes, for example, a print instruction for printing the web page, a storing instruction for storing the web page in the HDD 116, and a transmission instruction for transmitting the web page to another apparatus. Upon accepting the execution instruction, the execution instruction accepting portion 161 stores in a predetermined area of the HDD 116 the URL for access to the web page displayed on the display portion 114, and executes the processing specified by the accepted execution instruction with respect to the web page. The execution instruction accepting portion 161 outputs the URL of the web page to the user relating portion 163.

The user authentication portion 165 authenticates the user who operates the MFP 100. The user authentication portion 165 accepts authentication information input by the user through the operation portion 115 and compares the authentication information with authentication information stored in the HDD in advance, and when the two agree, authenticates the user. The user authentication portion 165 treats all the instructions input through the operation portion 115 between the authentication and a logout instruction as if they were instructions input by the authenticated user. The authentication information is related to user identification information for identifying the user. Here the example where a password is used as the authentication information will be described. When the user inputs the user's user identification information and a password through the operation portion 115, and if the HDD 116 stores in advance the same pair of user identification information and password as the input pair of user identification information and password, then the user authentication portion 165 authenticates the user. If the HDD 116 does not store the same pair, the user authentication portion 165 does not authenticate the user. Upon authenticating the user, the user authentication portion 165 outputs the user's user identification information to the user relating portion 163.

Into the user relating portion 163, the user identification information of the authenticated user is input from the user authentication portion 165, and the URL is input from the execution instruction accepting portion 161. The user relating portion 163 generates access relation information that relates the user identification information to the URL and stores the access relation information in the HDD 116. When the RAM 112 stores a key word that is related to the URL, the user relating portion 163 generates key word relation information that relates the key word to the user identification information and stores the key word relation information in the HDD 116. When the RAM 112 stores a key word that is related to the URL, the user relating portion 163 generates relation information that relates the key word to the URL and stores the relation information in the HDD 116.

Here the example where the user relating portion 163 generates user relation information that acts as the access relation information, key word relation information, and relation information and stores the user relation information in the HDD 116 will be described. FIG. 4 is a diagram showing an example of the format of the user relation information. Referring to FIG. 4, the user relation information includes a URL, user identification information, and a key word. The user relation information includes a plurality of user relation records each with a unique URL. The user relating portion 163 generates a user relation record every time a URL is input from the execution instruction accepting portion 161 and stores the user relation record in the HDD 116. When the HDD 116 already stores a user relation record whose URL is the same as the URL of the generated user relation record, the user relating portion 163 adds to the stored user relation record the user identification information and key word included in the generated user relation record. When the already stored user relation record includes the same user identification information and key word, they are not added.

The URL/key word determining portion 170 includes an attribute information search portion 175 to search for user identification information on the basis of attribute information, a user search portion 173 to search for key words on the basis of user identification information, a narrowing down portion 171 to search for key words on the basis of a narrowing down word, a user relation information acquiring portion 177 to acquire user relation information from some other MFP, and a user definition information acquiring portion 179 to acquire user definition information from some other MFP.

The MFP 100 stores user definition information in its HDD 116 in advance. FIG. 5 is a diagram showing an example of the format of the user definition information. Referring to FIG. 5, the user definition information relates user identification information to attribute information. The user definition information includes a plurality of user definition records each with unique user identification information. The attribute information is information unique to a user. Here the attribute information defines belongingness denoting the department of the user's company and a user key word as the user's own key word. The user key word is, for example, a technical terminology in the user's major field or a word related to a piece of work of which the user is in charge (e.g., a research theme, project name).

Referring back to FIG. 3, the attribute information search portion 175 accepts attribute information, searches for user definition information using the accepted attribute information as a key, and extracts a user definition record that includes the accepted attribute information. The attribute information search portion 175 accepts from the operation portion 115 attribute information input by the user through the operation portion 115. It is possible that the attribute information search portion 175 displays a list of attribute information defined in the user definition information included in the user definition information so that the user selects one or more pieces of attribute information from the displayed attribute information list. It is also possible that the attribute information search portion 175 accepts a plurality of pieces of attribute information. When a plurality of pieces of attribute information are accepted, the attribute information search portion 175 extracts all user definition records that include any of the accepted pieces of attribute information. The attribute information search portion 175 outputs user identification information included in the extracted user definition record to the user search portion 173. When a plurality of user definition records are extracted, the attribute information search portion 175 outputs to the user search portion 173 a plurality of pieces of user identification information each included in the plurality of user definition records.

The user search portion 173 accepts the user identification information, searches for user relation information using the accepted user identification information as a key, and extracts a user relation record that includes the accepted user identification information. When the user inputs the user identification information through the operation portion 115, the user search portion 173 accepts the user identification information from the operation portion 115, and when the user inputs the attribute information through the operation portion 115, the user search portion 173 accepts the attribute information from the operation portion 115. It is possible that when the user identification information is accepted from the operation portion 115, the user search portion 173 accepts a plurality of pieces of user identification information. It is also possible that the user search portion 173 displays on the display portion 114 a list of user identification information defined in the user definition record included in the user definition information so that user selects one or more pieces of user identification information from the displayed user identification information list. When a plurality of pieces of user identification information are accepted, the user search portion 173 extracts all user relation records that include any of the accepted pieces of user identification information. The user search portion 173 outputs the extracted user relation record to the narrowing down portion 171. There is a case where the user search portion 173 does not accept user identification information. In this case, the user search portion 173 outputs to the narrowing down portion 171 all the user relation records included in the user relation information. The case where the user search portion 173 does not accept user identification information is the case where the user does not input through the operation portion 115 the user identification information and attribute information.

The narrowing down portion 171 accepts a narrowing down word, searches for, using the accepted narrowing down word as a key, a web page having the URL defined in the user relation record, and extracts a web page that includes the narrowing down word. The narrowing down portion 171 then extracts a user relation record that includes the URL of the extracted web page from user relation records input from the user search portion 173. That is, the user relation record extracted by the narrowing down portion 171 is any one of the user relation records input from the user search portion 173. There is a case where the narrowing down portion 171 does not accept a narrowing down word. In this case, the narrowing down portion 171 extracts all the user relation records input from the user search portion 173.

The CPU 111 is set to any one of two modes including the URL search mode and key word search mode by the user's instruction. When the CPU 111 is set to the URL search mode, the narrowing down portion 171 outputs the URL defined in the extracted user relation record to the URL display portion 167. When a plurality of user relation records are extracted, the narrowing down portion 171 outputs to the URL display portion 167 a plurality of URLs each included in the plurality of user relation records.

When the CPU 111 is set to the key word search mode, the narrowing down portion 171 outputs to the key word accepting portion 151 the key word defined in the extracted user relation record. When a plurality of user relation records are accepted, the narrowing down portion 171 outputs to the key word accepting portion 151 a plurality of key words each included in the plurality of user relation records. When any one of the plurality of user relation records includes a plurality of key words, the narrowing down portion 171 outputs the plurality of key words to the key word accepting portion 151. When a plurality of user relation records are extracted, the narrowing down portion 171 outputs to the key word accepting portion 151 key words each included in the plurality of user relation records. The key word accepting portion 151 accepts the key word input from the narrowing down portion 171 and receives a search result from the search server 5.

The URL display portion 167 displays on the display portion 114 the URLs input from the narrowing down portion 171. When the user designates any one of the displayed URLs, the URL display portion 167 outputs the designated URL to the page display portion 157.

The user relation information acquiring portion 177 transmits to the other MFPs 100A, 100B, and 100C a transmission demand of user relation information stored in each of the other MFPs, receives the user relation information from each of the other MFPs, and adds the user relation records included in the received user relation information to the user relation information stored in the MFP 100. When the user relation information acquiring portion 177 receives user relation information from the other MFPs 100A, 100B, and 100C, the user relation information to be searched for by the user search portion 173 is the user relation record included in the user relation information each stored in the MFPs 100, 100A, 100B, and 100C. When the user relation information acquiring portion 177 does not receive user relation information from the other MFPs 100A, 100B, and 100C, the user relation information to be searched for by the user search portion 173 is the user relation record included in the user relation information stored in the MFP 100.

The user definition information acquiring portion 179 transmits to the other MFPs 100A, 100B, and 100C a transmission demand of user definition information, receives the user definition information each stored in the other MFPs 100A, 100B, and 100C, and adds the user definition records included in the received user definition information to the user definition information stored in the MFP 100. When the user definition information acquiring portion 179 receives the user definition information from the other MFPs 100A, 100B, and 100C, the user definition information to be searched for by the attribute information search portion 175 is the user definition record included in each of the MFPs 100, 100A, 100B, and 100C. When the user definition information acquiring portion 179 does not receive the user definition information from the other MFPs 100A, 100B, and 100C, the user definition information to be searched for by the attribute information search portion 175 is the user definition record included in the MFP 100.

Figure 6:
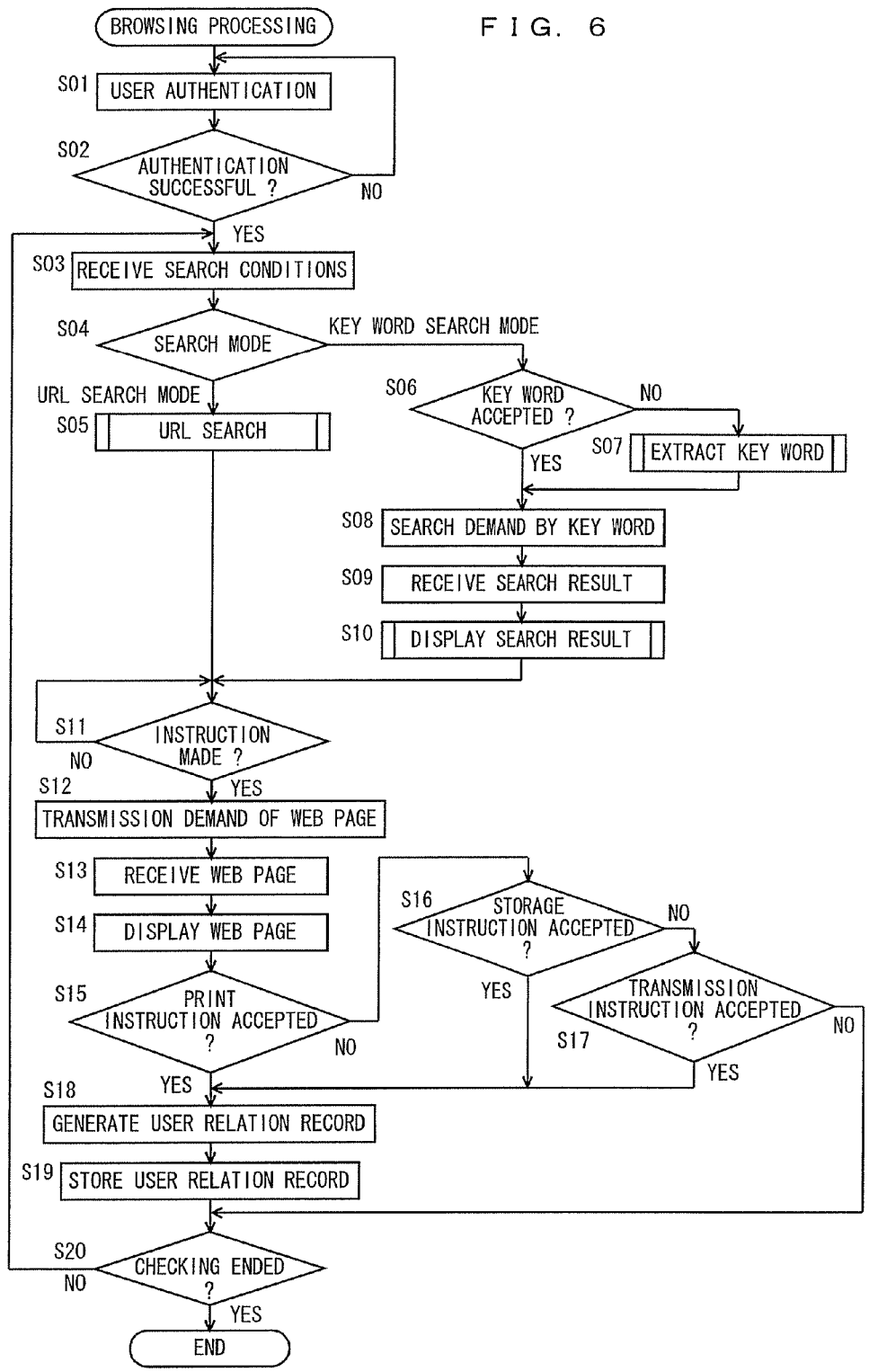
FIG. 6 is a flowchart showing an example of the flow of browsing processing.

FIG. 6 is a flowchart showing an example of the flow of browsing processing. The browsing processing is processing executed in the CPU 111 by executing a data search program stored in the ROM 113. Referring to FIG. 6, the CPU 111 executes user authentication processing for authenticating the user who operates the MFP 100 (step S01). The CPU 111 accepts from the operation portion 115 a pair of user identification information and key word and judges whether the accepted pair of user identification information and key word are stored in the HDD 116 in advance. Then the CPU 111 judges whether the authentication is successful (step S02). When the accepted pair of user identification information and key word are stored in the HDD 116 in advance, the authentication is successful, and the processing proceeds to step S03. Otherwise, the processing proceeds to step S01. It is possible to proceed the processing to step S03 without user authentication, where the user is treated as a guest user. In this case, since the user who operates the MFP 100 cannot be specified, the steps from S14 to S17, described later, are not executed.

In step S03, search conditions are accepted. The CPU 111 displays on the display portion 114 a search condition setting screen and accepts search conditions input by the user according to the screen. Referring to FIG. 7, the search condition setting screen includes an area for setting what to display, an area for setting a user search range, an area for setting an MFP search range, and an area for setting a narrowing down word. In the area for setting what to display, either the item "Registered URL" or the item "Registered Key Word" is selectable. When the item "Registered URL" is selected, the MFP 100 is set to the URL search mode, and when the item "Registered Key Word" is selected, the MFP 100 is set to the key word search mode.

The area for setting the user search range includes the item "Input User Identification Information" and the item "Input User Attribute Information." When the item "Input User Identification Information" is selected, a demand is made to input user identification information in the area below the item for inputting user identification information. When the item "Input User Attribute Information" is selected, a demand is made to input user attribute information in the area below the item for inputting user attribute information. The user can select either the item "Input User Identification Information" or the item "Input User Attribute Information."

The area for setting the MFP range is a range for setting data to be searched for. The area for setting the MFP range includes the item "This Apparatus," the item "Apparatus Possessed by This Department," the item "Apparatus Possessed by Associated Department," and an area for inputting the name of the associated department. When the item "This Apparatus" is selected, the user relation information stored in the MFP 100, which is "This Apparatus," becomes the object of searching. When the item "Apparatus Possessed by This Department" is selected, the CPU 111 makes the user relation information stored in the MFPs possessed by the user's department the object of searching. The CPU 111 stores in the HDD 116 apparatus definition data that relates apparatus identification information for identifying the apparatuses to department identification information for identifying the department that possesses the apparatus, and searches the apparatus definition data to specify the MFPs possessed by the user's department. The CPU 111 then makes the user relation information stored in the specified MFPs possessed by the user's department the object of searching. The MFPs possessed by the user's department are all the MFPs possessed by the department that possesses the MFP 100, which the user operates. The MFPs may be all the MFPs possessed by the department to which the user who operates the MFP 100 belongs. When the item "Apparatus Possessed by Associated Department" is selected, a demand is made to input the name of the department in the area provided below the item for inputting the department name. When the item "Apparatus Possessed by Associated Department" is selected, the CPU 111 makes the user relation information stored in all the MFPs possessed by the department specified by the input department name and an associated department the object of searching. The CPU 111 stores in the HDD 116 department association data in which the department identification information of an associated department is related, and searches the department association data to specify the associated department. It is possible that instead of making a department associated with the input department name the associated department, a department associated with the department that possesses the MFP 100, which the user operates, is made the associated department. It is also possible to make the department to which the user belongs and a department associated with the user's department the associated departments.

The area for setting a narrowing down word includes the item "Narrow Down" and an area for inputting a narrowing down word. When the item "Narrow Down" is selected, a demand is made to input a narrowing down word in the area for inputting a narrowing down word.

Referring back to FIG. 6, in step S04, when, in the search conditions set in step S03, the URL search mode is selected, the processing proceeds to step S05, and when the key word search mode is selected, the processing proceeds to step S06. In step S05, URL search processing is executed and the processing proceeds to step S11. The URL search processing will be described later.

In step S06, the CPU 111 judges whether key words have been accepted. When the CPU 111 detects input of key words through the operation portion 115, the CPU 111 judges that key words have been accepted. When key words are accepted, the processing proceeds to step S08, and otherwise, the processing proceeds to step S07. In step S07, key word extracting processing is executed and the processing proceeds to step S08. The key word extracting processing will be described later. When the key word extracting processing is executed, at least one key word is extracted.

In step S08, the CPU 111 transmits to the search server 5 a search demand to execute a search using the key words. Specifically, the CPU 111 transmits to the search server 5 the key words accepted in step S06 or the key words extracted by executing the key word extracting processing in step S07 and demands a search. The search server 5 executes a search for a web page using the key words, and the CPU 111 receives a search result (step S09). The search result includes the URL of a web page extracted by the search server 5.

In step S10, the CPU 111 executes search result display processing, and the processing proceeds to step S11. While the search result display processing will be described in detail later, this is processing to display the search result on the display portion 114. The user can select a desired URL from among URLs included in the displayed search result. In step S11, the CPU 111 turns into a stand-by state until reception of a URL designation ("NO" in step S11). When the CPU 111 accepts a URL designation, the processing proceeds to step S12.

In step S11, the CPU 111 transmits a transmission demand of a web page having the designated URL to the apparatus specified by the URL. Here it is assumed that the apparatus specified by the URL is the web server 7. The CPU 111 demands the web server 7 to transmit the web page having the URL. Upon reception of the transmission demand of the web page, the web server 7 transmits the web page specified by the URL to the MFP 100, which has transmitted the transmission demand, and the MFP 100 receives the web page from the web server 7 (step S13). The CPU 111 then displays the received web page on the display portion 114 (step S14).

In step S15, the CPU 111 judges whether a print instruction to print the displayed web page has been accepted. When the print instruction is accepted, the processing proceeds to step S18, and otherwise, the processing proceeds to step S16. In step S16, the CPU 111 judges whether a storage instruction to store the displayed web page in the HDD 116 has been accepted. When the storage instruction is accepted, the processing proceeds to step S18, and otherwise, the processing proceeds to step S17. In step S17, the CPU 111 judges whether a transmission instruction to transmit the displayed web page to an external apparatus, e.g., the MFPs 100A, 100B, 100C, or PC200, has been accepted. When the transmission instruction is accepted, the processing proceeds to step S18, and otherwise, the processing proceeds to step S20.

In step S18, the CPU 111 generates a user relation record. Specifically, the CPU 111 generates a user relation record including the user identification information of the user authenticated in step 01 and the URL of the web page displayed in step S14. When key words are accepted in step S06, the CPU 111 generates a user relation record including the key words. When step S07 is executed, the CPU 111 generates a user relation record including the key words extracted by executing the key word extracting processing.

In step S19, the CPU 111 adds the generated user relation record to the user relation information stored in the HDD 116, and the processing proceeds to step S20. When the HDD 116 already stores user relation record that defines the same URL as the URL included in the generated user relation record, the CPU 111 adds user identification information defined by the generated user relation record to the user identification information of the already-existing user relation record, and adds key words defined by the generated user relation record to the key words of the already-existing user relation record.

It is possible that the display portion 114 displays a screen that inquires whether a user relation record will be generated, and that the processing proceeds to steps S18 and S19 only when there is an instruction from the user. In this case, it is possible that the display portion 114 displays a user relation record registration screen for displaying the user relation record to be stored, and that the user amends the user relation record. FIG. 8 is a diagram showing an example of the user relation record registration screen.

In step S20, the CPU 111 judges whether an instruction to end the browsing processing has been accepted. When the user inputs an instruction to end the browsing processing through the operation portion 115, such as by pressing the end key, then the CPU 111 accepts the instruction to end the browsing processing from the operation portion 115. Upon reception of the instruction to end the browsing processing, the CPU 111 ends the browsing processing, and otherwise, the processing goes back to step S03.

Figure 9:
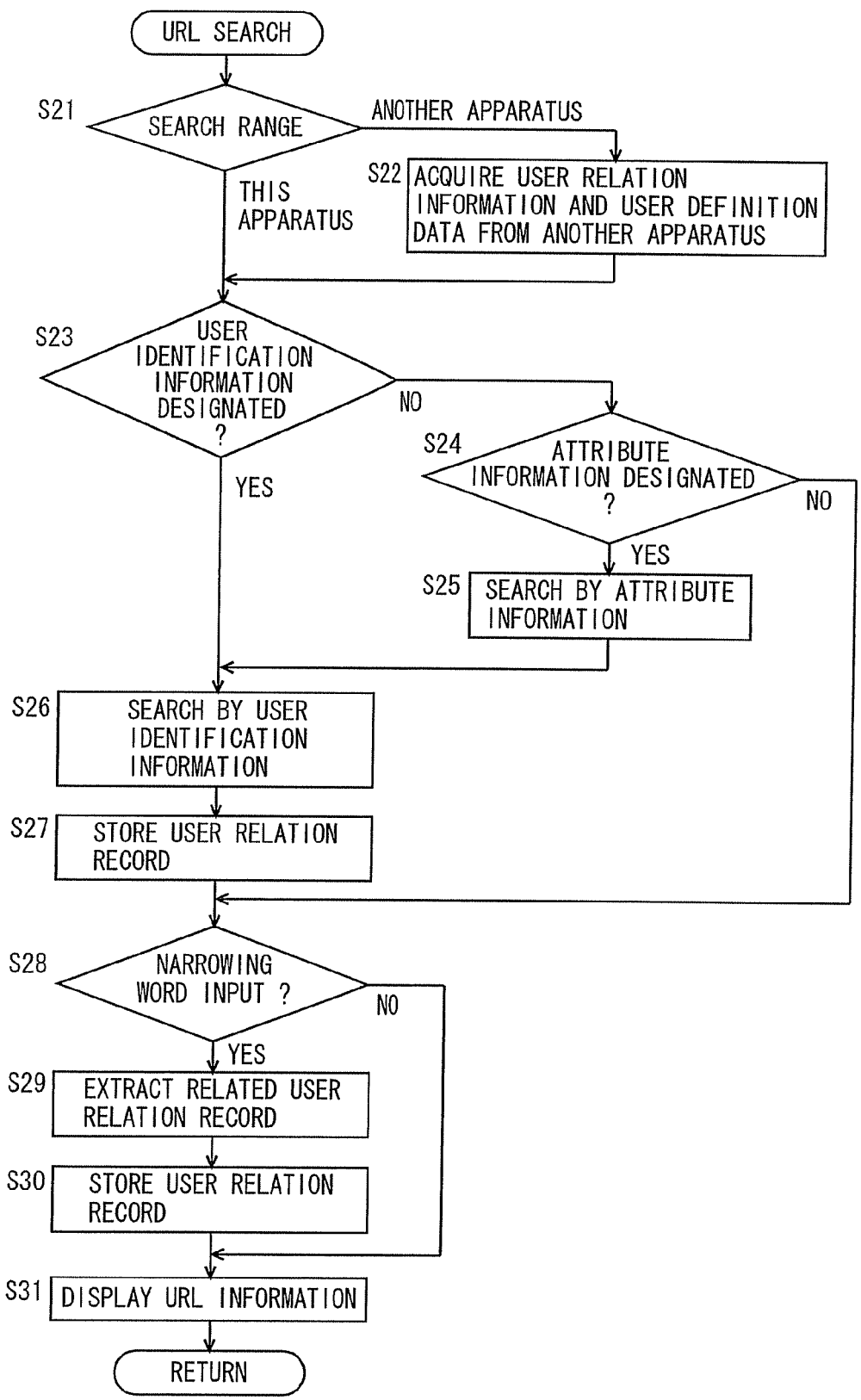
FIG. 9 is a flowchart showing an example of the flow of URL search processing.

FIG. 9 is a flowchart showing an example of the flow of the URL search processing. The URL search processing is processing executed in step S05 shown in FIG. 6. Referring to FIG. 9, the CPU 111 judges the range of a MFP search that has been set (step S21). The CPU 111 judges whether, in the above-described search condition setting screen (FIG. 7), the item "This Apparatus," the item "Apparatus Possessed by This Department," or the item "Apparatus Possessed by Associated Department" has been selected in the area for setting the MFP search range. When the item "This Apparatus" is selected, the processing proceeds to step S23, when the item "Apparatus Possessed by This Department" or the item "Apparatus Possessed by Associated Department" is selected, the processing proceeds to step S22. When the processing proceeds to step S23, the user relation information and user definition information stored in the HDD 116 of the MFP 100 are rendered the object of searching.

In step S22, the CPU 111 acquires user relation information from some other apparatus, and the processing proceeds to step S23. When the item "Apparatus Possessed by This Department" is selected in the search condition setting screen, the CPU 111 searches apparatus definition data stored in the HDD 116 to specify all the MFPs that this department possesses. When the item "Apparatus Possessed by Associated Department" is selected, the CPU 111 searches department relation definition data to specify the department specified by the department name input in the area for inputting the department name and an associated department, and specifies MFPs that the specified department possesses. The CPU 111 then demands the specified MFP to transmit the user relation information and user definition data stored in that MFP, and receives the user relation information and user definition data. The CPU 111 sets the user relation information and user definition data stored in the HDD 116 of the MFP 100 and the user relation information and user definition data received from the specified MFP to be the object of searching. Since user relation information and user definition data received from any one of the MFPs 100A, 100B, and 100C are rendered the object of searching, the parameter of searching increases, making it possible to make large the number of user relation records that are to be extracted by searching.

In step S23, the CPU 111 judges whether user identification information has been designated. The CPU 111 judges whether the item "Input User Identification Information" has been selected in the user search range of the search condition setting screen. When the item "Input User Identification Information" is selected, the processing proceeds to step S26, and otherwise, the processing proceeds to step S24. When the item "Input User Identification Information" is selected, the CPU 111 accepts the user identification information input in the area for inputting the user identification information, and the processing proceeds to step S26.

In step S24, the CPU 111 judges whether attribute information has been designated. The CPU 111 judges whether the item "Input User Attribute Information" has been selected in the user search range of the search condition setting screen. When the item "Input User Attribute Information" is selected, the processing proceeds to step S25, and otherwise, the processing proceeds to step S28. When the item "Input User Attribute Information" is selected, the CPU 111 accepts the attribute information input in the area for inputting the attribute information, and the processing proceeds to step S25.

In step S25, the CPU 111 searches the user definition information that is set to be the object of searching using the attribute information as a key to extract a user definition record including the attribute information. The attribute information includes information related to the user, for example, the department to which the user belongs and a user key word. Thus, when a department in charge of a technical field that is sought to be searched is designated as attribute information, the user definition records of all the users belonging to the department are extracted. Also, when the user key word has defined therein a terminology used in the technical field related to the user, designating as attribute information the terminology used in the user's technical field that is sought to be searched enables it to extract a user definition record in which the terminology is defined in the user key word. Thus, inputting in the attribute information the department in charge of a field that is sought to be searched or a terminology used in the field enables it to extract all the users belonging to the department or all the users related to the field. The CPU 111 then specifies the user identification information defined by the extracted user definition record, and the processing proceeds to step S26. When a plurality of user definition records are extracted, pieces of user identification information respectively included in the user definition records are specified.

In step S26, the CPU 111 searches the user relation information that is set to be the object of searching using as a key the user identification information accepted in step S23 or the user identification information specified in step S25. Since a user relation record including the user identification information is extracted as a result of the searching, the CPU 111 stores the extracted user relation record in the RAM 112 (step S27).

In the next step S28, the CPU 111 judges whether a narrowing down word has been accepted. The CPU 111 judges whether the item "Narrow Down" has been selected in the area for setting the narrowing down word of the search condition setting screen. When the item "Narrow Down" is selected, the processing proceeds to step S29, and otherwise, the processing proceeds to step S31. When the item "Narrow Down" is selected, the CPU 111 accepts the narrowing down word input in the area for setting the narrowing down word, and the processing proceeds to step S29.

In step S29, the CPU 111 extracts a user relation record related to the narrowing down word, and the processing proceeds to step S30. The user relation record that is to be the object of extraction is the user relation record stored in the RAM 112 in step S27. When step S27 is not executed, that is, neither the user identification information nor attribute information is accepted, the object of extraction is the user relation record included in user relation information that is the object of processing. The user relation record related to the narrowing down word is a user relation record such that the web page specified by the URL defined by the user relation record includes the narrowing down word. When a plurality of narrowing down words are accepted, any one of the narrowing down words may be included.

In step S30, the CPU 111 stores in the RAM 112 the user relation record extracted in step S29. When the user relation record is already stored in the RAM 112 in step S27, the CPU 111 deletes the user relation record and then stores the user relation record extracted in step S29.

In step S31, the CPU 111 displays on the display portion 114 a URL search result display screen that includes the URL defined by the user relation record stored in the RAM 112.

FIG. 10 is a diagram showing an example of the URL search result display screen. Referring to FIG. 10, the URL search result display screen includes an area for displaying search conditions and an area for displaying URLs. In the area for displaying search conditions, the user identification information and narrowing down word that have been designated as search conditions are displayed. The area for displaying URLs enables designation among the displayed URLs. When a URL is designated, the CPU 111 accepts that URL (step 11 in FIG. 6). It is possible that the URL search result display screen displays a part of the web page specified by the URL together therewith.

Figure 11:
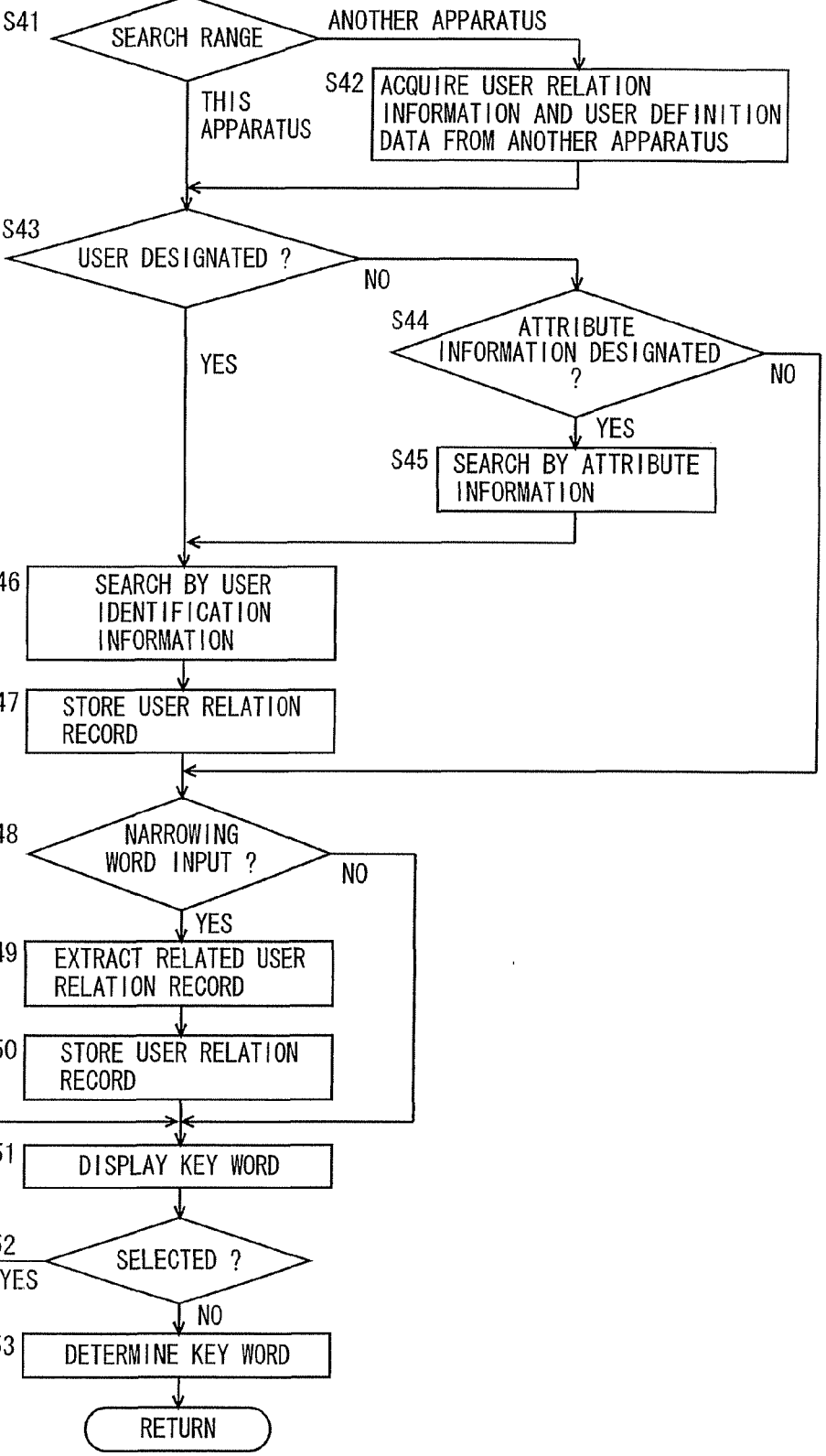
FIG. 11 is a flowchart showing an example of the flow of key word extracting processing.

FIG. 11 is a flowchart showing an example of the flow of key word extracting processing. The key word extracting processing is processing executed in step S07 shown in FIG. 6. Referring to FIG. 11, the processing between steps S40 and S50 are the same as steps S21 to S30 of the URL search processing shown in FIG. 9. Description of steps S40 to S50, therefore, will not be repeated.

In step S51, the CPU 111 displays on the display portion 114 a key word search result display screen that includes key words defined by the user relation record stored in the RAM 112.

Figures 12, 13:
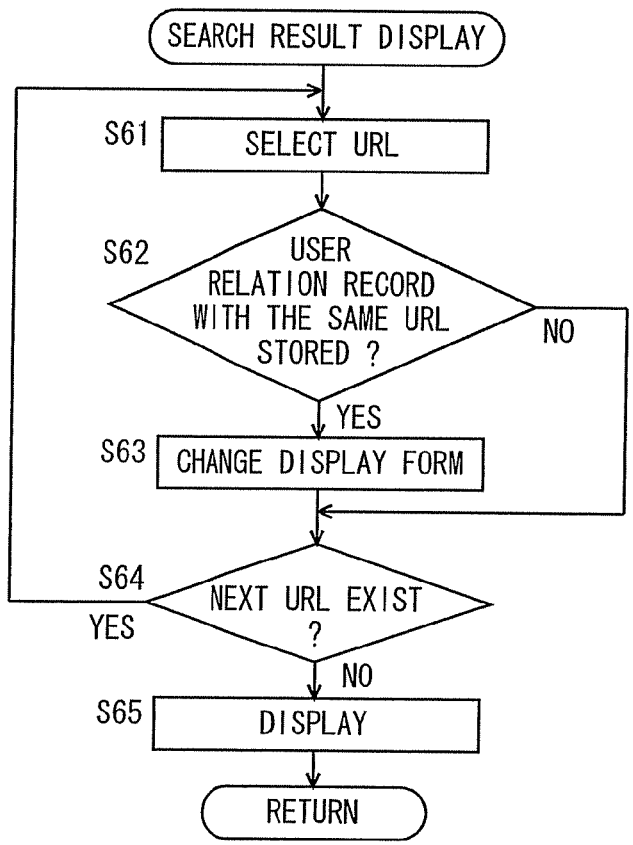
FIG. 12 is a diagram showing an example of the key word search result display screen.
FIG. 13 is a flowchart showing an example of the flow of search result display processing.

FIG. 12 is a diagram showing an example of the key word search result display screen. Referring to FIG. 12, the key word search result display screen includes an area for displaying the user identification information and an area for displaying key words. In the area for displaying the user identification information, the user identification information that has been designated as a search condition in the above-described search condition setting screen or the user identification information of the attribute information that has been designated as a search condition is displayed. The area for displaying key words is classified for every user identification information. By displaying key words for every user identification information, it is possible to know the user who input a given key word in the past, which serves as a reference in selecting a key word. The area for displaying key words enables designation among the displayed key words.

Referring back to FIG. 11, in step S52, the CPU 111 judges whether a key word has been selected. When a key word displayed in the area for displaying key words in the key word search result display screen is designated, the CPU 111 accepts the selection of that key word. When a key word is selected, the processing proceeds to step S53, and otherwise, the processing goes back to step S51.

In step S53, the CPU 111 determines the selected key word as the key word used for searching, and the processing goes back to the browsing processing.

FIG. 13 is a flowchart showing an example of the flow of search result display processing. The search result display processing is processing executed in step S10 shown in FIG. 6 and after receiving from the search server 5 a search result including a URL (step S09 shown in FIG. 6). Referring to FIG. 13, the CPU 111 selects the URL included in the search result received from the search server 5 as the object of processing (step S61). Next, the CPU 111 judges whether a user relation record that defines the same URL as the selected URL is stored in the user relation information (step S62). When such user relation record is stored, the processing proceeds to step S63, and otherwise, the processing skips step S63 and proceeds to step S64.

In step S63, the CPU 111 changes the form of display of the URL, among the selected URLs, such that the user relation record defines the same URL so that the URL has a different display form from the display form of the rest of the URLs. For example, a change is made to color, brightness, or a flashing display.

In step S64, the CPU 111 judges whether there is any URL, among the URLs included in the search result, that is yet to be selected. When there is an unselected URL, the processing proceeds to step S61, and otherwise, the processing proceeds to step S65. In step S65, the search result is displayed on the display portion 114.

FIG. 14 is a diagram showing an example of the search result display screen. Referring to FIG. 14, the search result display screen includes four URLs, among which the fourth URL (No. 32) is displayed in a form different from the display form of the rest of the URLs. The fourth URL is the URL of a web page that has been subject to a print instruction, storage instruction, or transmission instruction in the past by any user. This enables a user who is checking the search result to easily know the URL of a web page of high use value among the plurality of displayed URLs.

As has been described hereinbefore, when there is an instruction for processing other than the processing for display, e.g., a print instruction, storage instruction, or transmission instruction with respect to the web page received from the web server 7, then the MFP 100 according to this embodiment generates a user relation record that defines the URL of the web page and key words used to search for the web page, and stores the user relation record in the HDD 116. Web pages that are subject to printing, data storage, or data transmission are assumed to contain information of high use value, and thus the use of the URL of that web page or key words used to search for that URL in the next browsing enables an efficient search.

When an authenticated user makes an instruction to execute processing other than the processing for display, a user relation record including the user identification information of that user is generated. When the user identification information is designated, a URL or key words that are related to the user identification information by user relation information are extracted and displayed, and thus, it is made possible to display the URL of a web page that was subject in the past by a particular user to an instruction for executing processing other than the processing for display or display key words used to search for that web page. Thus, since only the URL of a web page that was subject to an instruction for processing other than the processing for display in the past by an arbitrary user who used the MFP 100 is displayed, it is made possible to display a URL of high use value. Also, since key words that were used to search for a web page that was subject to an instruction for processing other than the processing for display in the past by an arbitrary user who used the MFP 100 are displayed, it is made possible to give to the user of the MFP 100 effective key words.

When attribute information is designated, user identification information that is related to that attribute information by user definition information is designated, and further, a URL or key words that are related to the designated user identification information by user definition information are extracted and displayed. The attribute information includes information related to the user such as the department to which the user belongs and a user key word. Thus, designating as attribute information the department in charge of a field that is sought to be searched enables it to extract all the users belonging to that department. Also, designating as attribute information a terminology used in a field that is sought to be searched enables it to extract all the users related to the field. Further, the URL of a web page that was subject to an instruction for processing other than the processing for display in the past by the extracted user or key words used to search for that web page are displayed. This enables even a user who does not know information related to other users to cause to display a URL or key words of high use value only from attribute information.

Also, among a plurality of URLs included in the search result received from the search server 5, a URL of a web page that was subject to an instruction to execute processing other than the processing for display in the past by any user is displayed in a form different from the display form of the rest of the URLs. In particular, since the MFP 100 is used by a plurality of users, it is possible to know the URL of a web page that was subject to an instruction to execute processing other than the processing for display in the past by others. This enables a user who is checking the search result to easily know the URL of a web page of high use value among the plurality of displayed URLs.

Further, since the MFP 100 receives user relation information each stored in the other MFPs 100A, 100B, and 100C and renders the user relation information the object of searching, an increased number of URLs or key words can be displayed.

While in this embodiment URL has been exemplified as access information, access information will not be limited to the foregoing insofar as the location of data is indicated. For example, access information can be IP (Internet Protocol) address and the like. While in this embodiment the MFP 100 has been described as an example of the information-processing apparatus, it will be readily appreciated that the present invention can also be taken as a data search method or a data search program for causing the MFP 100 to execute the processing shown in FIGS. 6, 9, and 13.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information-processing apparatus comprising:
    a data receiving portion to receive data from outside said apparatus;
    an instruction accepting portion to accept an execution instruction specifying processing of the received data to be executed;
    a nontransitory access storing portion to store access information for access to the data when the accepted execution instruction specifies processing of the received data other than the processing for display, and the nontransitory access storing portion does not store the access information when the accepted execution instruction only specifies display processing;
    a user acquiring portion to acquire user identification information for identifying a user who inputs the execution instruction;
    a relating portion to, when the user identification information is acquired, store user relation information defining a relation between the stored access information and the acquired user identification information;
    a designation portion to designate user identification information;
    an access extracting portion to extract access information related to the designated user identification information by the user relation information; and
    an access display portion to display the extracted access information.

2. The information-processing apparatus according to claim 1, further comprising:
    a key word accepting portion to accept a key word for searching for data;
    a result acquiring portion to transmit the accepted key word to a search server and to receive a search result from the search server;
    a result display portion to display the received search result; and
    a designation accepting portion to accept designation of access information included in the displayed search result,
    wherein said result display portion includes a change portion to display a part of access information included in the search result in a different display form from a display form of the rest part of access information, the part of access information being related to the stored access information.

3. The information-processing apparatus according to claim 2, further comprising an access acquiring portion to acquire the access information from another information-processing apparatus,
    wherein said change portion displays a part of access information included in the search result in a different display form from a display form of the rest part of access information, the part of access information being related to the acquired access information.

4. The information-processing apparatus according to claim 1, further comprising:
    a definition storing portion to store user definition information defining a relation between the user identification information and attribute information; and
    an attribute accepting portion to accept the attribute information,
    wherein said designation portion designates user identification information related to the accepted attribute information by the user definition information.

5. The information-processing apparatus according to claim 1, further comprising:
    an access acquiring portion to acquire the stored access information from some other information-processing apparatus; and
    a user relation acquiring portion to acquire the stored user relation information from said other information-processing apparatus,
    wherein said access extracting portion extracts access information related to the designated user identification information by the acquired user relation information among the access information acquired by said access acquiring portion.

6. The information-processing apparatus according to claim 5, further comprising:
    a definition storing portion to store user definition information defining a relation between the user identification information and the attribute information;
    an attribute accepting portion to accept the attribute information; and
    a definition acquiring portion to acquire the user definition information from said other information-processing apparatus, wherein said designation portion designates user identification information related to the accepted attribute information by the user definition information acquired by said definition acquiring portion.

7. The information-processing apparatus according to claim 1, further comprising a word accepting portion to accept a narrowing down word for narrowing down the key words, wherein said access extracting portion extracts access information related to the narrowing down word, the access information being related to the designated user identification information by the access relation information.

8. The information-processing apparatus according to claim 1, further comprising:

a word accepting portion to accept a narrowing down word for narrowing down key words;

an access extracting portion to extract, from the stored access information, access information related to the narrowing down word; and an access display portion to display the extracted access information.

9. An information-processing apparatus comprising:

a key word acquiring portion to acquire key words for searching for data;

a result acquiring portion to transmit the acquired key words to a search server and to receive a search result from the search server, the search result including access information for access to data;

a result display portion to display the received search result;

a designation accepting portion to accept designation of the access information included in the displayed search result;

a data receiving portion to receive data from outside said apparatus, the data being specified by the designated access information;

an instruction accepting portion to accept an execution instruction specifying processing of the received data to be executed;

a nontransitory key word storing portion to store the acquired key words when the accepted execution instruction specifies processing of the received data other than the processing for display, and the nontransitory keyword storing portion does not store the acquired keywords when the accepted execution instruction only specifies display processing;

a user acquiring portion to acquire user identification information for identifying a user who inputs the execution instruction;

a relating portion to, when the user identification information is acquired, store key word relation information defining a relation between the stored key words and the acquired user identification information;

a designation portion to designate user identification information; and a key word extracting portion to extract key words related to the designated user identification information by the key word relation information;

wherein said key word acquiring portion acquires the extracted key words.

10. The information-processing apparatus according to claim 9, further comprising:

a definition storing portion to store user definition information defining a relation between the user identification information and attribute information; and an attribute accepting portion to accept the attribute information, wherein said designation portion designates user identification information related to the accepted attribute information by the user definition information.

11. The information-processing apparatus according to claim 9, further comprising:

a key word display portion to display the extracted key words; and a selection portion to select at least one of the displayed key words, wherein said key word acquiring portion acquires the selected at least one key word.

12. The information-processing apparatus according to claim 9, further comprising:

an access storing portion to store access information for access to the data when the accepted execution instruction specifies processing other than the processing for display;

a relation storing portion to store relation information defining a relation between the stored access information and the stored key words; and a word accepting portion to accept a narrowing down word for narrowing down the key words, wherein said key word extracting portion extracts key words related to the designated user identification information by the key word relation information, the key words being related to access information related to the narrowing down word by the relation information.

13. The information-processing apparatus according to claim 9, further comprising:

an external key word acquiring portion to acquire the key words from some other information-processing apparatus; and a key word relation acquiring portion to acquire the key word relation information from said other information-processing apparatus, wherein said key word extracting portion extracts, among the key words acquired by said external key word acquiring portion, a key word related to the designated user identification information by the acquired key word relation information.

14. The information-processing apparatus according to claim 13, further comprising:

a definition storing portion to store user definition information defining a relation between the user identification information and attribute information;

an attribute accepting portion to accept the attribute information; and a definition acquiring portion to acquire the stored user definition information from said other information-processing apparatus, wherein said designation portion designates user identification information related to the accepted attribute information by the user definition information acquired by said definition acquiring portion.

15. The information-processing apparatus according to claim 9, further comprising:

an access storing portion to store access information for access to the data when the accepted execution instruction specifies processing other than the processing for display;

a relation storing portion to store relation information defining a relation between the stored access information and the stored key words;

a word accepting portion to accept a narrowing down word for narrowing down the key words;

a key word extracting portion to extract key words related by the relation information to access information related to the accepted narrowing down word, among the stored access information;
a key word display portion to display extracted key words; and
a selection portion to select at least one of the displayed key words,
wherein said key word acquiring portion acquires the selected at least one key word.

16. The information-processing apparatus according to claim 9, further comprising an access storing portion to store access information for access to the data when the accepted execution instruction specifies processing other than the processing for display;
wherein said result display portion includes a change portion to display a part of access information included in the search result in a different display form from a display form of the rest part of access information, the part of access information being related to the stored access information.

17. The information-processing apparatus according to claim 16, further comprising an access acquiring portion to acquire the access information from another information-processing apparatus,
wherein said change portion displays a part of access information included in the search result in a different display form from a display form of the rest part of access information, the part of access information being related to the acquired access information.

18. A method for searching for data comprising:
externally receiving data;
accepting an execution instruction specifying processing of the received data to be executed;
storing access information for access to the data when the accepted execution instruction specifies processing of the received data other than the processing for display, and not storing the access information when the accepted execution instruction only specifies display processing;
acquiring user identification information for identifying a user who inputs the execution instruction;
storing user relation information defining a relation between the stored access information and the acquired user identification information;
designating user identification information;
extracting access information related to the designated user identification information by the user relation information; and
displaying the extracted access information.

19. A method for searching for data comprising:
acquiring key words for searching for data;
transmitting the acquired key words to a search server and receiving a search result from the search server, the search result including access information for access to data;
displaying the received search result;
accepting designation of the access information included in the displayed search result;
externally receiving data specified by the designated access information;
accepting an execution instruction specifying processing of the received data to be executed;
storing the acquired key words when the accepted execution instruction specifies processing of the received data other than the processing for display, and not storing the acquired keywords when the accepted execution instruction only specifies display processing;
acquiring user identification information for identifying a user who inputs the execution instruction;
storing key word relation information defining a relation between the stored key words and the acquired user identification information;
designating user identification information; and
extracting key words related to the designated user identification information by the key word relation information;
wherein the extracted key words are provided to the step of the acquiring key words.

20. A nontransitory computer readable medium storing a data searching program which when executed by a computer, said program causing the computer to execute processing comprising:
externally receiving data;
accepting an execution instruction specifying processing of the received data to be executed;
storing access information for access to the data when the accepted execution instruction specifies processing of the received data other than the processing for display, and not storing the access information when the accepted execution instruction only specifies display processing;
acquiring user identification information for identifying a user who inputs the execution instruction;
storing user relation information defining a relation between the stored access information and the acquired user identification information;
designating user identification information;
extracting access information related to the designated user identification information by the user relation information; and
displaying the extracted access information.

21. A nontransitory computer readable medium storing a data searching program which when executed by a computer, said program causing the computer to execute processing comprising:
acquiring key words for searching for data;
transmitting the acquired key words to a search server and receiving a search result from the search server, the search result including access information for access to data;
displaying the received search result;
accepting designation of the access information included in the displayed search result;
externally receiving data specified by the designated access information;
accepting an execution instruction specifying processing of the received data to be executed;
storing the acquired key words when the accepted execution instruction specifies processing of the received data other than the processing for display, and not storing the acquired keywords when the accepted execution instruction only specifies display processing;
acquiring user identification information for identifying a user who inputs the execution instruction;
storing key word relation information defining a relation between the stored key words and the acquired user identification information;
designating user identification information; and
extracting key words related to the designated user identification information by the key word relation information;

wherein the extracted key words are provided to the step of the acquiring key words.

22. The information-processing apparatus according to claim 1, further comprising:
   a user information acquiring portion to acquire user information for identifying a user who inputs the execution instruction; and
   a relating portion that relates the user information to the access information to generate and store user relation information when the access information is stored in response to the accepted execution instruction.

23. The information-processing apparatus according to claim 9, further comprising:
   a user information acquiring portion to acquire user information for identifying a user who inputs the execution instruction; and
   a relating portion that relates the user information to the acquired keywords to generate and store key word relation information when the acquired keywords are stored in response to the accepted execution instruction.

* * * * *